United States Patent
Nishida et al.

(10) Patent No.: US 10,899,388 B2
(45) Date of Patent: Jan. 26, 2021

(54) VEHICLE-BODY LOWER FACE STRUCTURE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Hiroyuki Takahashi, Hiroshima (JP); Yosuke Fukamachi, Hiroshima (JP); Satoshi Okamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 81 days.

(21) Appl. No.: 16/362,164

(22) Filed: Mar. 22, 2019

(65) Prior Publication Data
US 2019/0291783 A1    Sep. 26, 2019

(30) Foreign Application Priority Data

Mar. 23, 2018 (JP) .................................. 2018-056449

(51) Int. Cl.
| | | |
|---|---|---|
| *B62D 21/15* | (2006.01) | |
| *B60G 1/00* | (2006.01) | |
| *B60G 7/00* | (2006.01) | |
| *B60G 21/00* | (2006.01) | |
| *B60G 21/10* | (2006.01) | |
| *B62D 35/02* | (2006.01) | |

(52) U.S. Cl.
CPC .............. *B62D 21/155* (2013.01); *B60G 1/00* (2013.01); *B60G 7/001* (2013.01); *B60G 21/007* (2013.01); *B60G 21/106* (2013.01); *B62D 35/02* (2013.01); *B60G 2204/4308* (2013.01); *B60G 2206/10* (2013.01)

(58) Field of Classification Search
None
See application file for complete search history.

(56) References Cited

U.S. PATENT DOCUMENTS

| | | | |
|---|---|---|---|
| 9,132,713 B1* | 9/2015 | Akaki | B60G 21/051 |
| 2012/0013095 A1* | 1/2012 | Gerrard | B60G 21/051 |
| | | | 280/124.134 |
| 2014/0125025 A1* | 5/2014 | Lee | B60G 21/051 |
| | | | 280/124.1 |
| 2016/0325596 A1* | 11/2016 | Kim | B60G 21/051 |

FOREIGN PATENT DOCUMENTS

| | | | |
|---|---|---|---|
| JP | 2012-148647 A | 8/2012 | |
| JP | 2017-039354 A | 2/2017 | |
| WO | WO-2012164373 A1 * | 12/2012 | ............. B60G 7/001 |

* cited by examiner

*Primary Examiner* — Lori L Lyjak
(74) *Attorney, Agent, or Firm* — Studebaker & Brackett PC (57) ABSTRACT

An arm cover comprises a main part and a front part. These parts are configured such that when the rear suspension takes a standard vehicle-weight position, these parts are respectively inclined rearwardly and downwardly, wherein an angle of inclination of the inclined front part is smaller than that of the inclined main part. When the rear suspension takes the standard vehicle-weight position, a front edge of the front part is located at a higher level than a bottom face portion of a under cover, and when the rear suspension takes a rebound position, the front edge of the front part is located at a position which is higher than a level of the bottom face portion of the under cover and close to a rear end portion of the under cover.

8 Claims, 7 Drawing Sheets

VEHICLE-BODY LOWER FACE STRUCTURE

BACKGROUND OF THE INVENTION

The present invention relates to a vehicle-body lower face structure, and specifically, relates to the vehicle-body lower face structure in which a torsion beam type of rear suspension comprising a pair of right-and-left trailing arms and a torsion beam connecting the trailing arms is provided and a floor under cover for airflow straightening is attached to a portion of a vehicle body in front of the rear suspension so as to cover a vehicle-body lower face.

Conventionally, the torsion beam type of rear suspension comprising a pair of right-and-left trailing arms which extend in a longitudinal direction and the torsion beam which extends in a vehicle width direction and connects the trailing arms is known.

In a vehicle provided with the above-described torsion beam type of rear suspension, it is general to provide an arm cover which is attached to a lower face of the trailing arm so as to cover the trailing arm from below therewith. This arm cover suppresses traveling air flowing below a vehicle floor from flowing into a rear wheel house, so that it can be properly prevented that a vehicle rear airflow is disturbed by the traveling air flowing into the rear wheel house.

Meanwhile, the floor under cover for airflow straightening is provided at the portion of the vehicle body in front of the rear suspension so as to cover the vehicle-body lower face. When the trailing arm moves vertically during vehicle traveling, a level of the above-described arm cover so changes relative to a lower face of the above-described floor under cover that there occurs a level gap between the arm cover and the lower face of the floor under cover, thereby producing some discontinuity in the longitudinal direction therebetween. Consequently, the traveling air flowing below the lower face of the floor under cover may be disturbed by the arm cover improperly. The above-described level gap is also caused by attachment variations of the respective covers, the number of passengers in a cabin, or the like. Thus, it has been requested to provide some countermeasures against the above-described disturbance of the airflow.

Herein, Japanese Patent Laid-Open Publication No. 2012-148647 discloses a structure which comprises the trailing arm of the torsion beam type of rear suspension and the arm cover for airflow straightening which covers the lower portion of the trailing arm. Japanese Patent Laid-Open Publication No. 2017-39354 discloses a structure which comprises the torsion beam type of rear suspension and a rear under cover for airflow straightening which is provided at a rear vehicle-body lower face.

The above-described patent documents, however, do not refer to any problem regarding cooperation of the arm cover for airflow straightening which covers the lower portion of the trailing arm and the floor under cover for airflow straightening which covers the vehicle-body lower face positioned in front of the rear suspension.

SUMMARY OF THE INVENTION

Accordingly, an object of the present invention is to provide a vehicle-body lower face structure which can properly narrow a gap formed between a front end of the arm cover and a rear end portion of the floor under cover, thereby suppressing disturbance of the vehicle rear airflow which may be caused by the above-described level gap between the arm cover and the lower face of the floor under cover even in a case where inclination of the trailing arm becomes large when the rear suspension takes a rebound position or the like.

The present invention is a vehicle-body lower face structure, comprising a torsion beam type of rear suspension comprising a pair of right-and-left trailing arms and a torsion beam connecting the trailing arms, a floor under cover for airflow straightening attached to a portion of a vehicle body in front of the rear suspension so as to cover a vehicle-body lower face, an arm cover for airflow straightening attached to a lower portion of each of the trailing arms of the rear suspension so as to cover a lower face of the trailing arm, wherein the arm cover comprises a main part and a front part which is provided in front of the main part, and the main part and the front part of the arm cover are configured such that when the rear suspension takes a standard vehicle-weight position, both of the main part and the front part are respectively inclined rearwardly and downwardly, wherein an angle of inclination of the rearwardly-and-downwardly inclined front part is smaller than an angle of inclination of the rearwardly-and-downwardly inclined main part of the arm cover.

Specifically, the arm cover attached to the lower portion of the trailing arm is configured such that when the rear suspension takes the standard vehicle-weight position, a front edge of the front part of the arm cover is located at a higher level than a bottom face portion of the floor under cover, and when the rear suspension takes a rebound position, the front edge of the front part of the arm cover is located at a position which is higher than a level of the bottom face portion of the floor under cover and close to a rear end portion of the floor under cover.

Herein, the above-described "standard vehicle-weight position" of the rear suspension means a standard position of the rear suspension which is generally used in designing of the rear suspension, which means of a position which the rear suspension takes when the vehicle is in a standard onboard state (generally, having two passengers in a full-tank condition).

According to the present invention, since the arm cover comprises the main part and the front part which is provided in front of the main part, which are configured such that when the rear suspension takes the standard vehicle-weight position, both of the main part and the front part are respectively inclined rearwardly and downwardly, the angle of inclination of the rearwardly-and-downwardly inclined front part being smaller than the angle of inclination of the rearwardly-and-downwardly inclined main part of the arm cover, the front edge of the front part of the arm cover can be so located at the higher level than the bottom face portion of the floor under cover in both cases where the rear suspension takes the standard vehicle-weight position or the rebound position that this front edge does not protrude downwardly from the bottom face portion of the floor under cover. Accordingly, the traveling air flowing below the vehicle floor is not disturbed.

Further, even in the case where the inclination of the trailing arm becomes large in the rebound position of the rear suspension or the like, the gap between the front edge of the arm cover and the rear end portion of the floor under cover which is positioned closely to the front edge of the arm cover can be as narrow as possible because of the front part of the arm cover being configured to have the smaller inclination angle, so that the disturbance of the vehicle rear airflow caused by the level gap between the arm cover and the lower face of the floor under cover can be properly suppressed.

In an embodiment of the present invention, the arm cover is configured such that the main part and the front part are positioned below a line connecting a pivot point where a font end portion of the trailing arm is pivotally supported and a rear-end upper portion of the arm cover, the main part of the arm cover which faces a spring supporting part of a spring seat which supports a lower portion of a suspension spring is configured to be linear, and the front part of the arm cover is configured to be curved forwardly and downwardly.

According to this embodiment, by configuring the main part and the front part of the arm cover as described above, the main part can be located at a lower position and also the front part can be made close to the floor under cover, so that attachment-level variations of the floor under cover can be properly reduced.

In another embodiment of the present invention, the arm cover further comprises a rear part of the arm cover which is provided in back of the main part is configured to be curved rearwardly and upwardly.

According to this embodiment, it can be properly prevented that a rear end portion of the arm cover hits against a road surface because of a curved shape of the rear part of the arm cover.

Other features, aspects, and advantages of the present invention will become apparent from the following description which refers to the accompanying drawings.

DETAILED DESCRIPTION OF THE INVENTION

Figure 2:
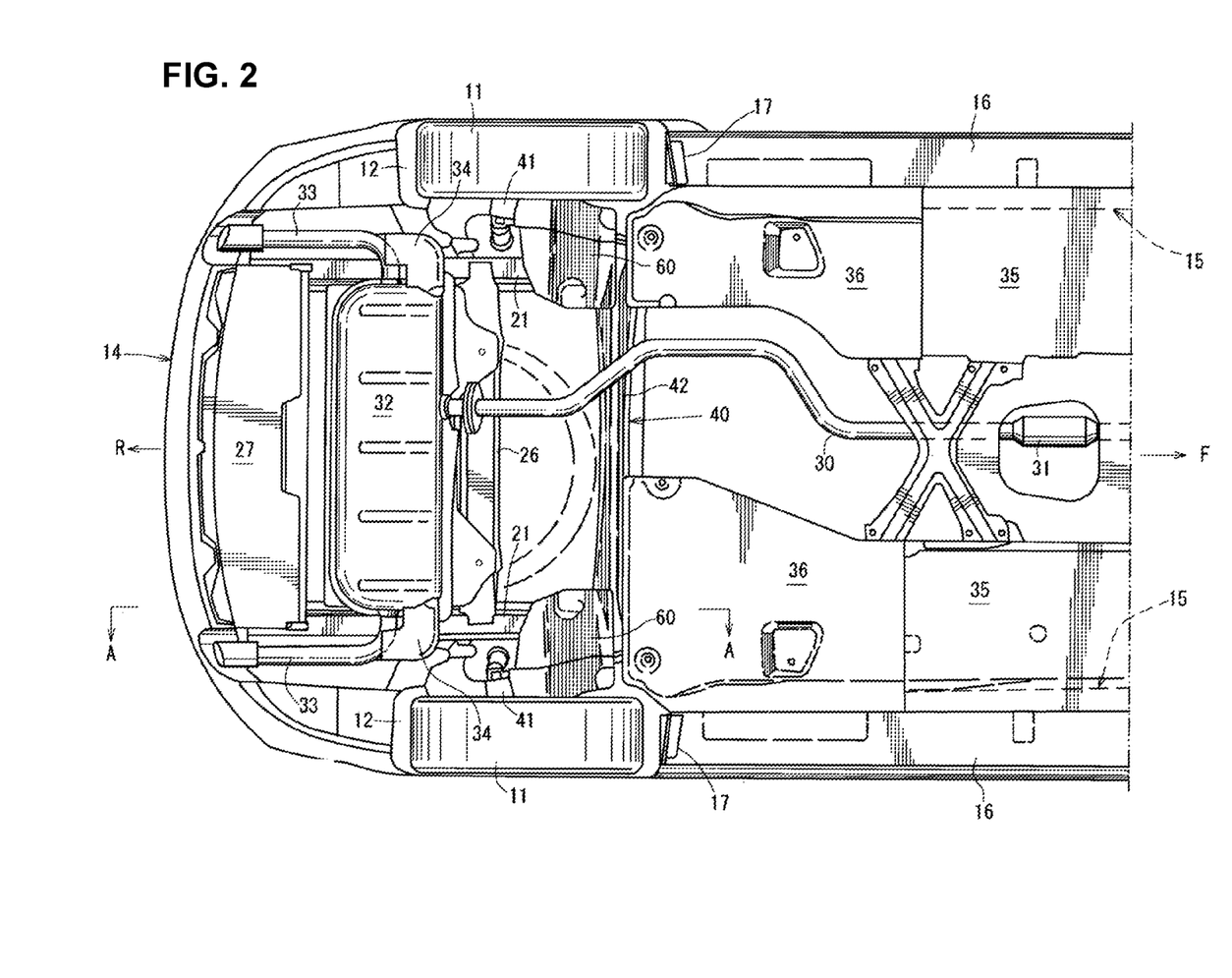
FIG. 2 is a bottom view of a major part of FIG. 1.
Figure 3:
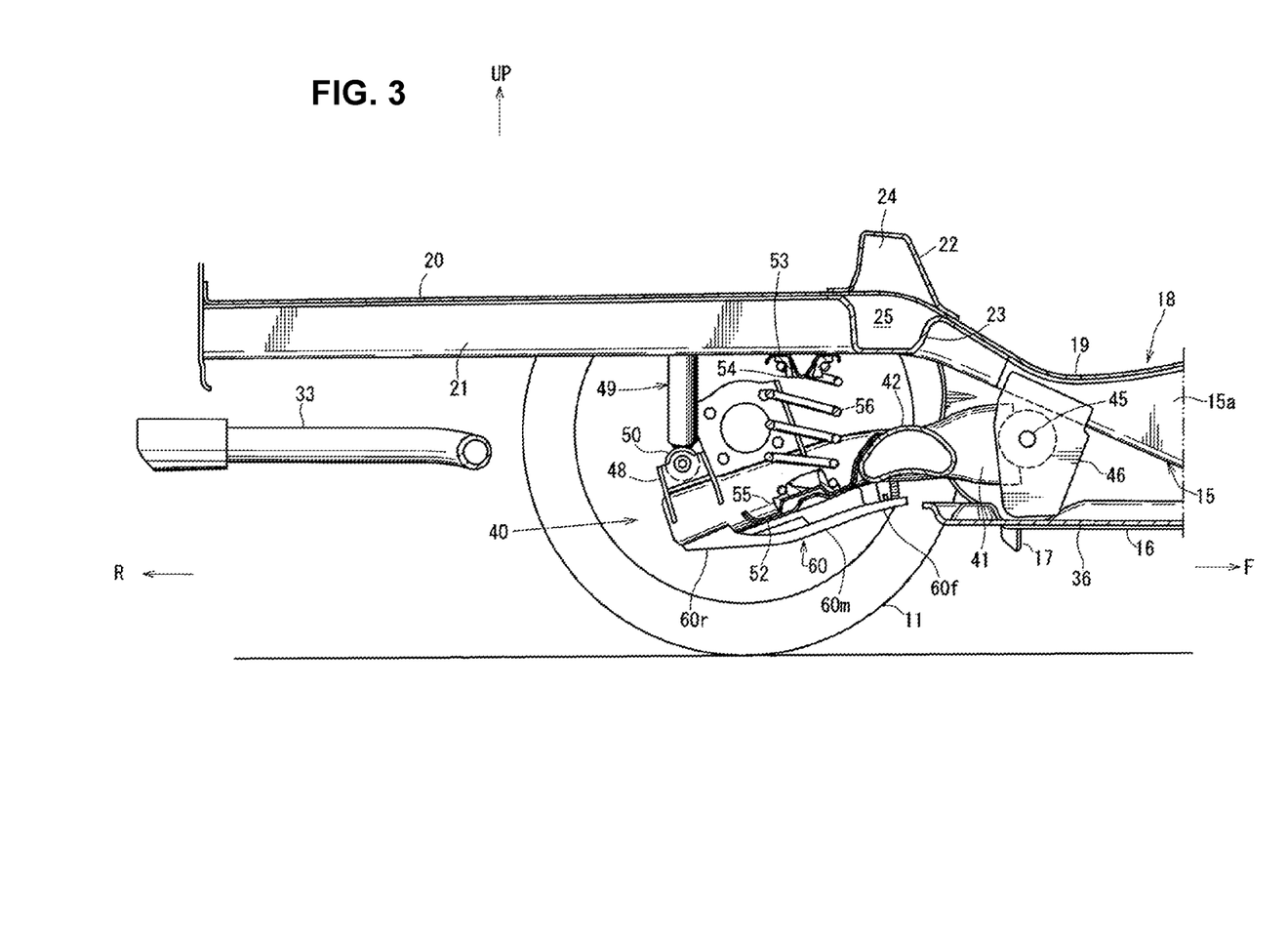
FIG. 3 is a sectional view taken along line A-A of FIG. 2, which shows a portion below a vehicle floor.

Hereafter, an embodiment of the present invention will be specifically described referring to the drawings. The drawings show a vehicle-body lower face structure, and FIG. 1 is a side view of a vehicle which is provided with the vehicle-body lower face structure, FIG. 2 is a bottom view of a major part of FIG. 1, and FIG. 3 is a sectional view taken along line A-A of FIG. 2, which shows a portion below a vehicle floor.

Figure 1:
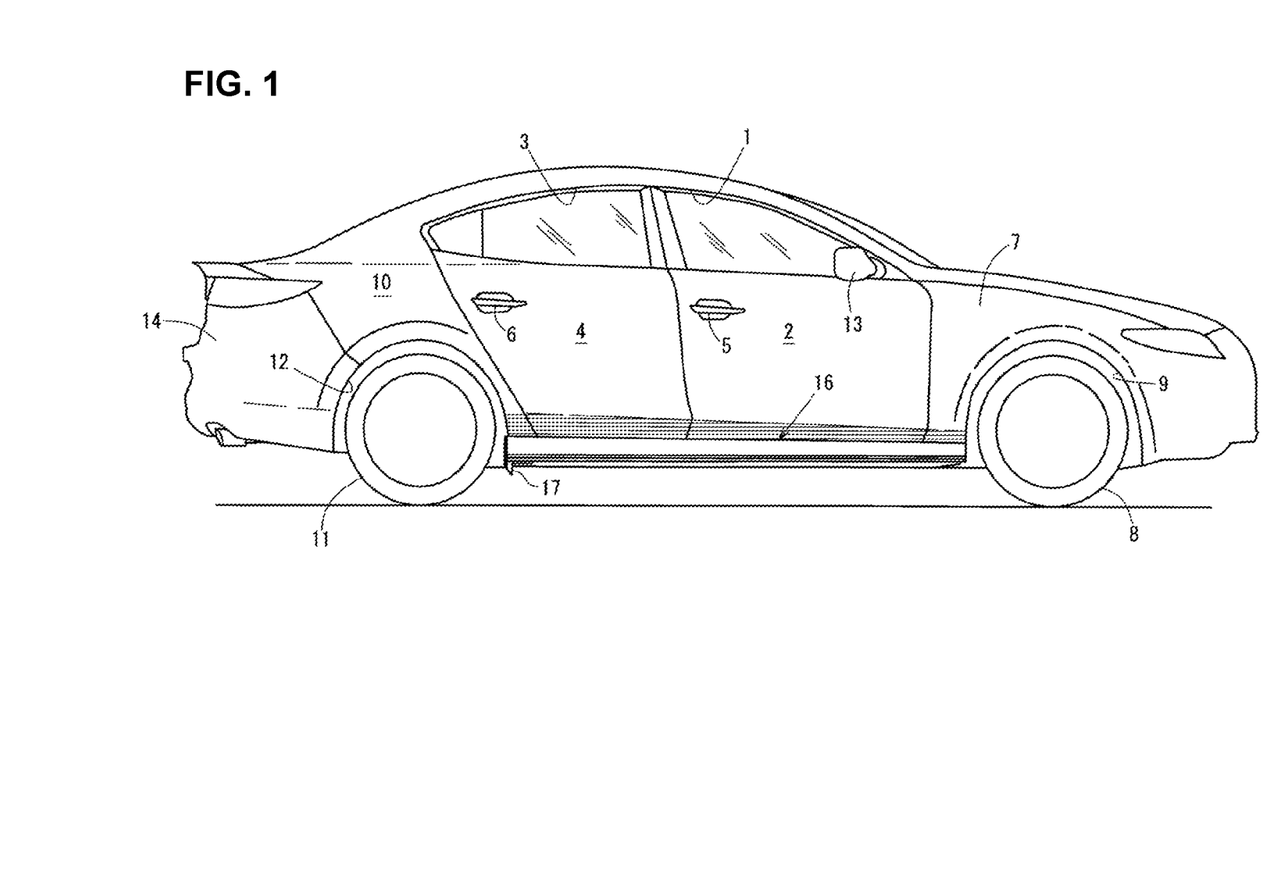
FIG. 1 is a side view of a vehicle which is provided with a vehicle-body lower face structure of the present invention.

As shown in FIG. 1, at a side portion of a vehicle body are provided a front door 2 as a side door which is configured to open or close a door opening 1 which is formed at a vehicle front portion and a rear door 4 as another side door which is configured to open or close another door opening 3 which is formed at a vehicle rear portion. The front door 2 is equipped with a door outer handle 5, and the rear door 4 is equipped with another door outer handle 6 similarly.

As shown in FIG. 1, a front fender panel 7 which covers a side of an engine room is provided in front of the front door 2, and a front wheel house 9 is integrally formed at a lower portion of the front fender panel 7 at a position corresponding to a front wheel 8.

As shown in FIG. 1, a rear fender panel 10 which covers a side of a baggage compartment is provided in back of the rear door 4, and a rear wheel house 12 is integrally formed at a lower portion of the rear fender panel 10 at a position corresponding to a rear wheel 11. In FIG. 1, reference character 13 denotes a door mirror, and reference character 14 denotes a rear bumper face which is configured to extend rearwardly, going around a vehicle side portion.

As shown in FIG. 2, a pair of right-and-left side sills 15 which extend in a vehicle longitudinal direction at a lower portion of a cabin at a position between a lower end portion of a rear edge of the front wheel house 9 and a lower end portion of a front edge of the rear wheel house 12 are provided. The side sill 15 is a vehicle-body reinforcing member having a side-sill closed cross section, which is formed by fixedly joining a side sill outer and a side sill inner 15a (see FIG. 3) and extends in the vehicle longitudinal direction.

As shown in FIG. 2, a pair of garnishes 16, 16 are attached to the above-described pair of right-and-left side sills 15 such that each garnish 16 covers each side sill 15 over a range from the front wheel house 9 to the rear wheel house 12.

A tire deflector 17 is provided at a rear end portion of the garnish 16 such that the tire deflector 17 faces the lower end portion of the front edge of the rear wheel house 12. This tire deflector 17 is configured to deflect a side-face airflow flowing at a vehicle-body side portion such that the side-face airflow is turned toward an outward side, in the vehicle width direction, so as not to flow into the rear wheel house 12 and adheres to an outer face of a tire wheel of the rear wheel 12.

As shown in FIG. 3, a floor panel 18 which forms respective bottom faces of the cabin or the baggage compartment is configured such that a front floor panel (not illustrated), a rear seat pan 19, and a rear floor panel 20 are continuous in the vehicle longitudinal direction.

As shown in FIGS. 2 and 3, the side sill 15 which extends in the vehicle longitudinal direction from the above-described front floor panel to a middle position, in a longitudinal direction, of the rear seat pan 19 is fixedly joined to the floor panel 18.

Further, as shown in FIGS. 2 and 3, a rear side frame 21 which extends in the vehicle longitudinal direction from a middle position, in a longitudinal direction, of the above-described rear seat pan 19 to a rear end of the rear floor panel 20 is provided, and a rear-side-frame closed cross section is formed between the rear side frame 21 and the floor panel 18.

As shown in FIG. 3, a cross member upper 22 and a cross member lower 23 are fixedly joined to an upper side and a lower side of a border portion of the floor panel 18 where the rear seat pan 19 and the rear floor panel 20 are positioned, and a closed cross section 24 which extends in the vehicle width direction is formed between the cross member 22 and the floor panel 18 and a closed cross section 25 which extends in the vehicle width direction is formed between the cross member 23 and the floor panel 18.

A rear cross member 26 which interconnects the above-described pair of right-and-left rear side frames 21, 21 in the vehicle width direction is provided in back of the cross member upper 22 and the cross member lower 23 (see FIG. 2).

Meanwhile, as shown in FIG. 2, an exhaust pipe 30 to guide exhaust gas rearwardly is provided at a tunnel portion below the vehicle floor. This exhaust pipe 30 is provided with a catalyst convertor 31, a silencer 32 is connected to a rear end portion of the exhaust pipe 30 which extends to a position behind the rear cross member 26, and a pair of tail pipes 33, 33 are attached to right-and-left both sides of the silencer 32. This tail pipe 33 is configured in an L shape such that it extends outwardly in the vehicle width direction and then extends rearwardly.

A cover for airflow straightening 34 is provided to cover between an outward side, in the vehicle width direction, of a front portion of the silencer 32 and a corner portion of the tail pipe 33 from below. Further, a rear under cover 27 which has a flat airflow-straightening face is provided behind the silencer 32.

As shown in FIG. 2, floor under covers for airflow straightening 35, 36 which cover another portion of the vehicle-body lower face than the tunnel portion are provided. Each of the floor under covers 35, 36 has a flat airflow-straightening face at its bottom face.

The front-and-rear floor under covers 35, 36 are configured to be continuous to each other in the vehicle longitudinal direction. As shown in FIG. 3, a torsion beam type of rear suspension 40 which suspends the rear wheel 11 is provided.

As shown in FIGS. 2 and 3, the rear suspension 40 comprises a pair of right-and-left trailing arms 41, 41 and a torsion beam 42 (torsional bar spring) which extends in the vehicle width direction and interconnects the trailing arms 41, 41.

Figure 4:
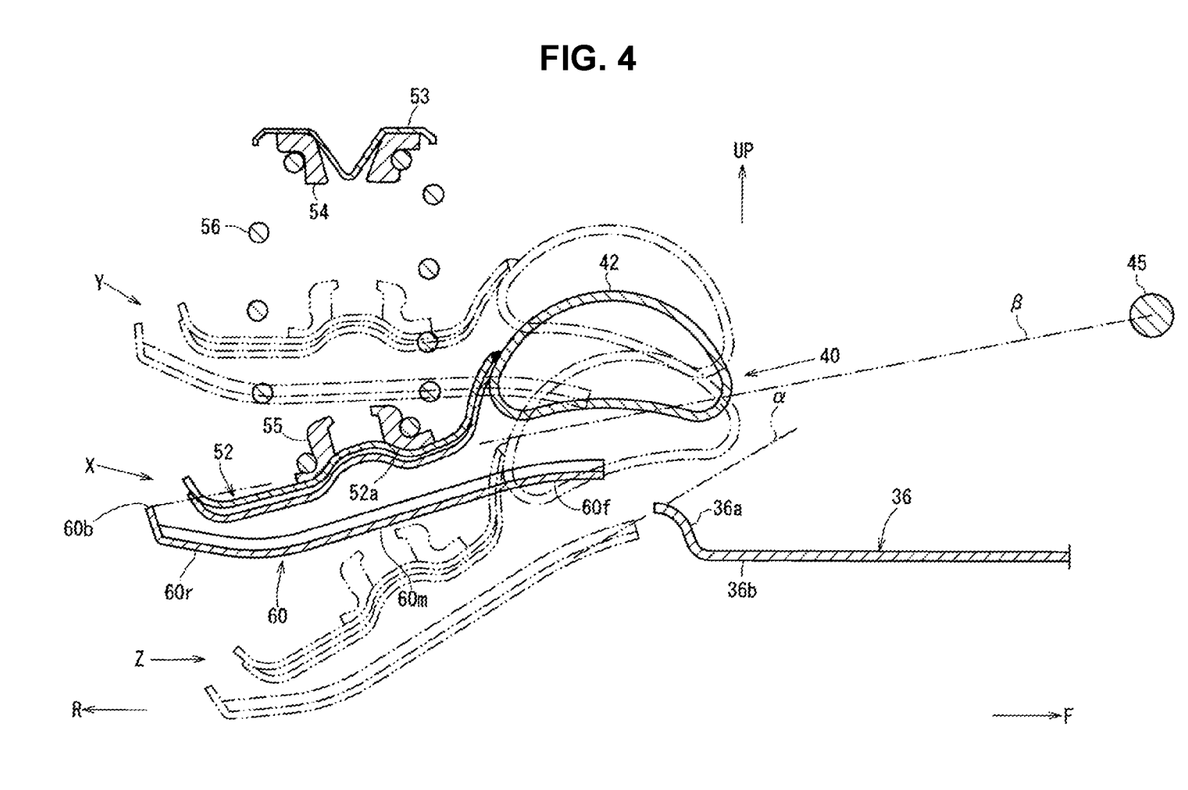
FIG. 4 is an enlarged sectional view of a major part of FIG. 3.
Figure 5:
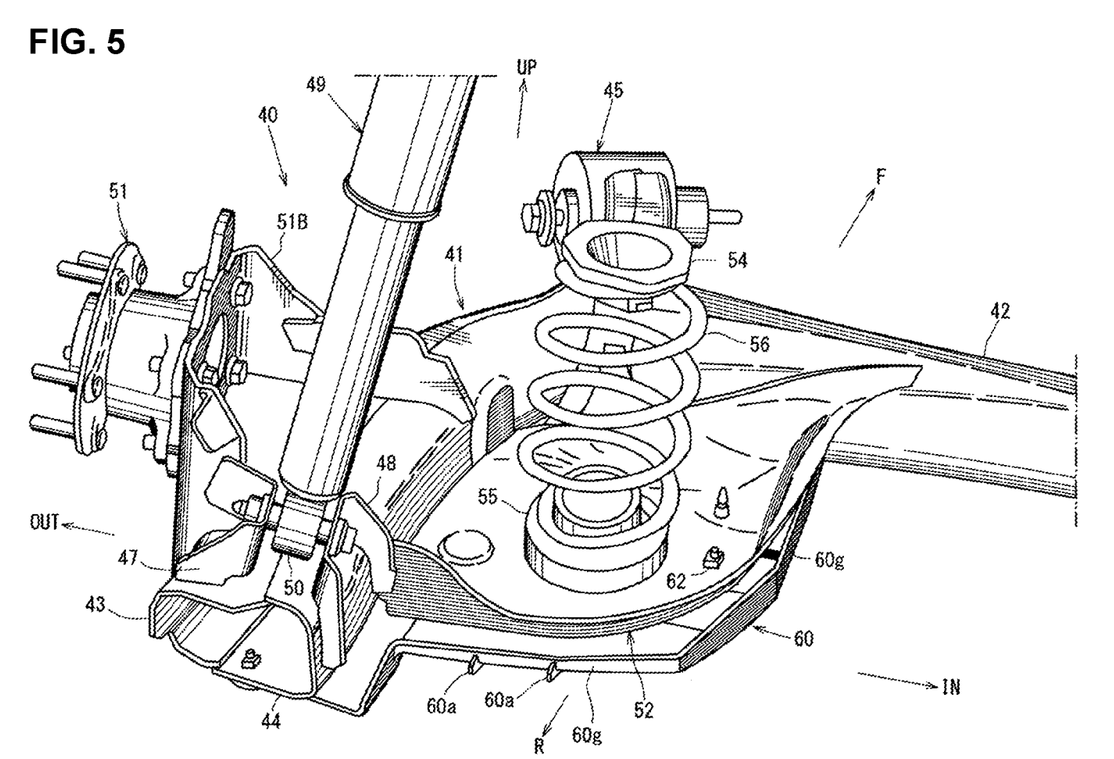
FIG. 5 is a perspective view of the vehicle-body lower face structure, when viewed from an upward-and-rearward side.
Figure 6:
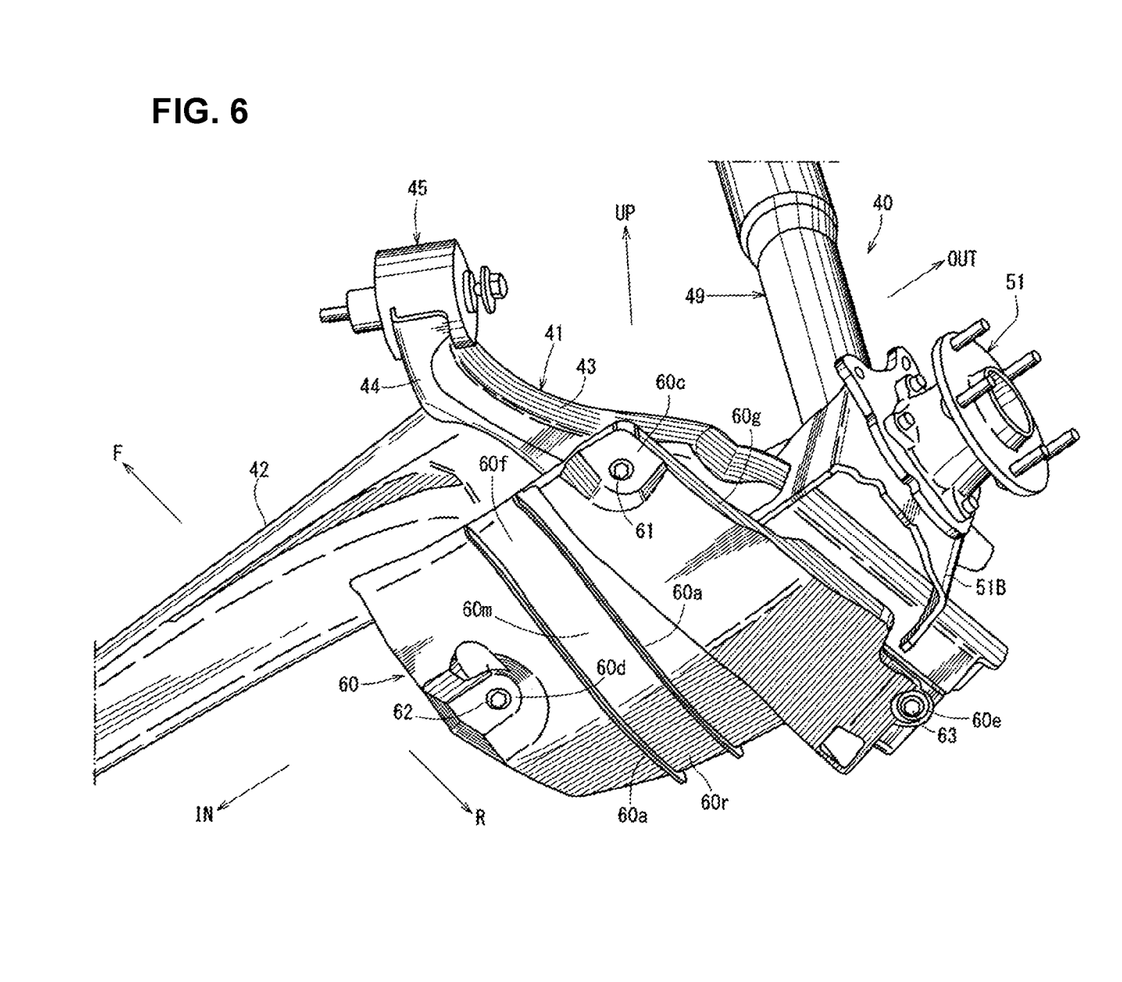
FIG. 6 is a perspective view of the vehicle-body lower face structure, when viewed from a downward-and-upward side.
Figure 7:
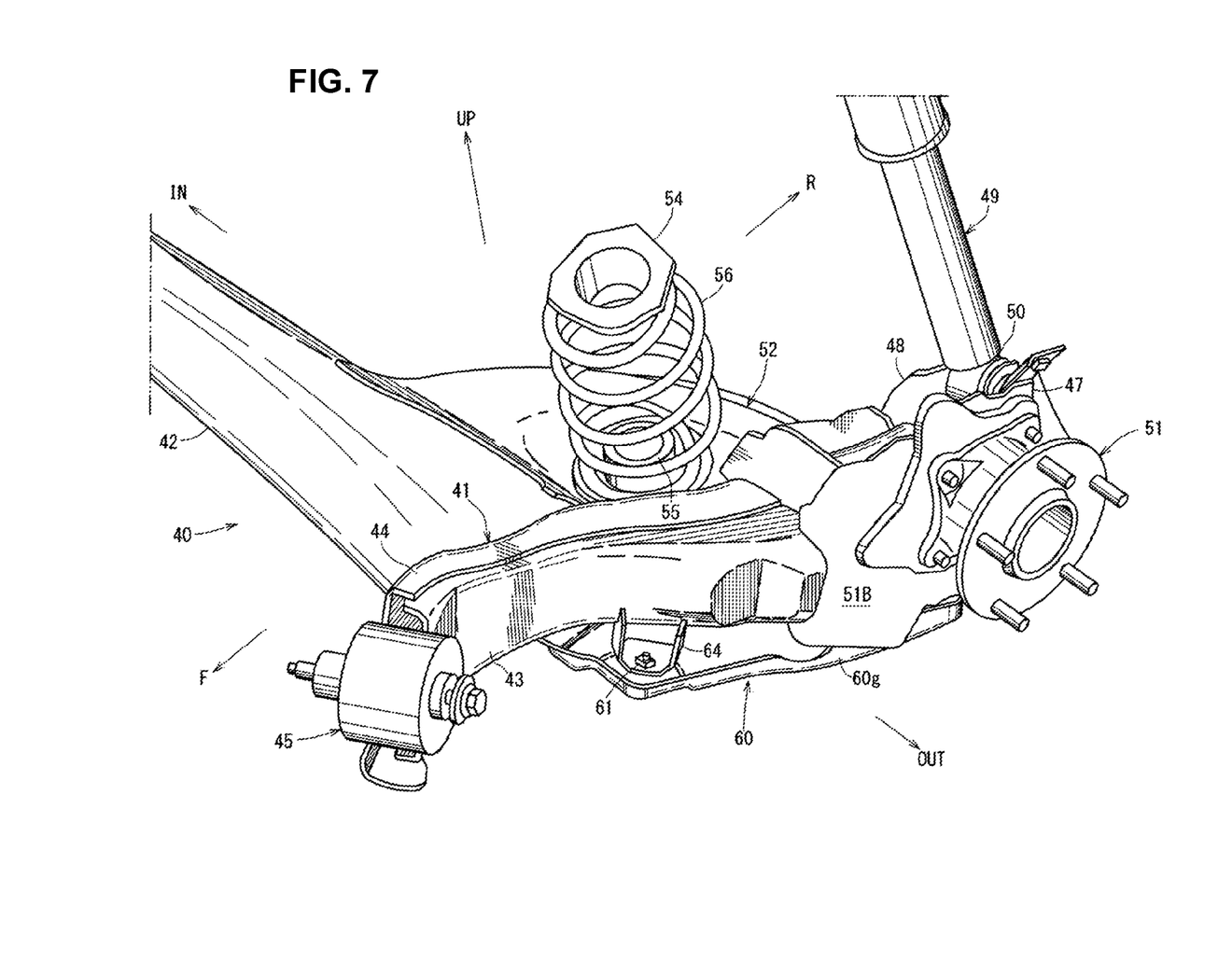
FIG. 7 is a perspective view of the vehicle-body lower face structure, when viewed from a forward-and-outward side.

FIG. 4 is an enlarged sectional view of a major part of FIG. 3, FIG. 5 is a perspective view of the vehicle-body lower face structure, when viewed from an upward-and-rearward side, FIG. 6 is a perspective view of the vehicle-body lower face structure, when viewed from a downward-and-upward side, and FIG. 7 is a perspective view of the vehicle-body lower face structure, when viewed from an forward-and-outward side.

As shown in FIGS. 3, 5, 6 and 7, the above-described trailing arm 41 is the one which comprises an outside arm member 43 and an inside arm member 44 which are fixedly joined and extends substantially in the vehicle longitudinal direction.

As shown in FIG. 3, a front end portion of the trailing arm 41 is pivotally supported at a vehicle body via an arm pivot 45 and an arm bracket 46. A pair of brackets 47, 48 are fixedly joined to a free end, i.e., a rear end portion of the trailing arm 41 as shown in FIG. 5, and a lower-end pivotal portion 50 of a damper 49 is pivotally supported at these brackets 47, 48.

The above-described damper 49 is attached between the rear end portion of the trailing arm 41 and the vehicle body, such as the rear side frame 21. Meanwhile, a spindle hub 51 (a so-called hub) to support the rear wheel 11 is attached to an outward side, in the vehicle width direction, of the trailing arm 41 via a bracket 51B and the like.

As shown in FIGS. 3 and 4, the torsion beam 42 is configured to have a hollow closed cross section. Further, as shown in FIGS. 4, 5 and 7, a lower spring seat 52 is attached to a connection corner portion between the trailing arm 41 and the torsion beam 42 by welding means.

As shown in FIGS. 3 and 4, an upper spring seat 53 is attached to a lower face of the rear side frame 21, which faces the lower spring seat 52 in a vertical direction. At a lower face portion of the upper spring seat 53 and an upper face portion of the lower spring seat 52 are fixedly arranged respective spring retainers 54, 55, and a coil spring 56 as a suspension spring is provided to extend between the upper-and-lower spring retainers 54, 55.

As shown in FIGS. 2, 3 and 4, the above-described floor under covers 35, 36 are covers for air flow straightening which are provided in front of the rear suspension 40 and cover the vehicle-body lower face. As shown in FIGS. 2, 3, 4 and 6, a plate-shaped arm cover for airflow straightening 60 which covers a lower face of the arm cover 60 is attached to a lower portion of the training arm 41.

As shown in FIG. 6, the arm cover 60 is attached to a corresponding component by using attaching members 61, 62, 63, such as bolts and nuts. As shown in FIGS. 6 and 7, a front outside corner portion of the arm cover 60 is attached to the outside arm member 43 of the trailing arm 41 via the attaching member 61 and the bracket 64, an inward longitudinally-middle portion of the arm cover 60 is attached to the lower spring seat 52 via the attaching member 62 as shown in FIGS. 5 and 6, and a laterally-outward rear end portion of the arm cover 60 is attached to the inside arm member 44 of the trailing arm 41 via the attaching member 63 as shown in FIG. 6.

Herein, the bolts of the above-described attaching members 61, 62, 63 are, as shown in FIG. 6, arranged at attachment portions 60c, 60d, 60e which are configured to be recessed upwardly from a bottom face of the arm cover 60 so that the airflow of the traveling air is not disturbed by the bolt heads of the attaching members 61, 62, 63.

In FIG. 4, the torsion beam 42, the lower spring seat 52, and the arm cover 60 are illustrated in states where these members 42, 52, 60 respectively take a standard vehicle-weight position X, a full bump position Y, and a rebound position Z.

As shown in the same figure, the arm cover 60 comprises a main part 60m and a front part 60f which is provided in front of the main part 60m. Herein, the main part 60m and the front part 60f of the arm cover 60 are configured such that when the rear suspension 40 takes the standard vehicle-weight position X (see a position illustrated by solid lines in FIG. 4), both of the main part 60m and the front part 60f are respectively inclined rearwardly and downwardly, wherein an angle of inclination of the rearwardly-and-downwardly inclined front part 60f is smaller than an angle of inclination of the rearwardly-and-downwardly inclined main part 60m. When the rear suspension 40 takes the standard vehicle-weight position X, a front edge of the front part 60f is located at a higher level than a bottom face portion 36b of the floor under cover 30, and when the rear suspension 40 takes the rebound position Z (see a position illustrated by imaginary lines in FIG. 4), the front edge of the front part 60f is located at a position which is higher than a level of the bottom face portion 36b of the floor under cover 36 and close to a rear end portion of the floor under cover 36 such that the front edge of the front part 60f closely approaches the rear end portion of the floor under cover 36 at a position below an imaginary face α which is formed by extending a face of the main part 60m.

Thus, regardless of the standard vehicle-weight position X or the rebound position Z of the rear suspension 40, the front edge of the front part 60f of the arm cover 60 is always located at the higher level than the bottom face portion 36b of the floor under cover 36, without protruding downwardly below the bottom face portion 36b, so that the traveling air flowing below the vehicle floor is not disturbed.

Further, even in the case where the inclination (rearwardly-inclined angle) of the trailing arm 41 becomes large in the rebound position Z or the like, a gap between the front edge of the arm cover 60 and the rear end portion of the floor under cover 36 is made so narrow because of the front part 60ƒ of the arm cover 60 being configured to have the smaller inclination angle that the disturbance of the vehicle rear airflow caused by this level gap is properly suppressed.

As shown in FIG. 4, a vertical wall 36a which rises upwardly from the bottom face portion 36b is formed integrally at the rear end portion of the floor under cover 36, so that the rigidity of the floor under cover 36 is improved.

Further, as shown in FIG. 4, the arm cover 60 is configured to be positioned below a line β which connects a pivot point 45 where a font end portion of the trailing arm 41 is pivotally supported and a rear-end upper portion 60b of the arm cover 60, the main part 60m of the arm cover 60 which faces a spring supporting part 52a of a lower spring seat 52 (spring seat) which supports a lower portion of the coil spring 56 as a suspension spring is configured to be linear, and the front part 60ƒ is configured to be curved forwardly and downwardly.

Accordingly, by configuring the front part 60ƒ in the curved shape, the main part 60m is located at a low position and also the front part 60ƒ is made close to the floor under cover 36, so that attachment-level variations of the floor under cover 30 is properly reduced.

As shown in FIG. 4, a rear part 60r of the arm cover 60 is integrally provided in back of the main part 60m and this rear part 60r is configured to be curved rearwardly and upwardly. Thereby, it can be properly prevented that a rear end portion of the arm cover 60 hits against a road surface because of this curved shape of the rear part 60r.

Further, as shown in FIG. 6, at the bottom face portion of the arm cover 60 are integrally formed plural ribs 60a, 60a which protrude downwardly and extend over a whole length, in the longitudinal direction, of the front part 60ƒ, the main part 60m, and the rear part 60r. These ribs 60a, 60a increase the rigidity of the arm cover 60.

Moreover, as shown in FIGS. 5, 6 and 7, a vertical wall portion 60g which rises upwardly is integrally formed at an inward side portion, an outward side portion, and a rearward side of the arm cover 60, except its forward side. The rigidity of the arm cover 60 is also increased by this vertical wall portion 60g.

In the figures, an arrow F shows a vehicle forward side, an arrow R shows a vehicle rearward side, an arrow IN shows an inward side in the vehicle width direction, an arrow OUT shows an outward side in the vehicle width direction, and an arrow UP shows a vehicle upward side.

As described above, the vehicle-body lower face structure of the present embodiment comprises the torsion beam type of rear suspension comprising the pair of right-and-left trailing arms 41 and the torsion beam 42 connecting the trailing arms 41, the floor under cover 36 for airflow straightening attached to the portion of the vehicle body in front of the rear suspension 40 so as to cover the vehicle-body lower face, the arm cover 60 for airflow straightening attached to the lower portion of each of the trailing arms 41 of the rear suspension 4 so as to cover the lower face of the trailing arm 41, wherein the arm cover 60 comprises the main part 60m and the front part 60ƒ which is provided in front of the main part 60m, and the main part 60m and the front part 60ƒ of the arm cover 60 are configured such that when the rear suspension 40 takes the standard vehicle-weight position X, both of the main part 60m and the front part 60ƒ are respectively inclined rearwardly and downwardly, wherein the angle of inclination of the rearwardly-and-downwardly inclined front part 60ƒ is smaller than the angle of inclination of the rearwardly-and-downwardly inclined main part 60m of the arm cover 60 (see FIGS. 3 and 4).

Specifically, the arm cover 60 attached to the lower portion of the trailing arm 41 is configured such that when the rear suspension 40 takes the standard vehicle-weight position X, the front edge of the front part 60ƒ of the arm cover 60 is located at the higher level than the bottom face portion 36b of the floor under cover 36, and when the rear suspension takes the rebound position Z, the front edge of the front part 60ƒ of the arm cover 60 is located at the position which is higher than the level of the bottom face portion 36b of the floor under cover 36 and close to the rear end portion of the floor under cover 36 (see FIGS. 3 and 4).

According to the present structure, since the arm cover 60 comprises the main part 60m and the front part 60ƒ which is provided in front of the main part 60m, which are configured such that when the rear suspension 40 takes the standard vehicle-weight position X, both of the main part 60m and the front part 60ƒ are respectively inclined rearwardly and downwardly, the angle of inclination of the rearwardly-and-downwardly inclined front part 60ƒ being smaller than the angle of inclination of the rearwardly-and-downwardly inclined main part 60m of the arm cover 60, the front edge of the front part 60ƒ of the arm cover 60 can be so located at the higher level than the bottom face portion 36b of the floor under cover 36 in both cases where the rear suspension 40 takes the standard vehicle-weight position X or the rebound position Z that this front edge does not protrude downwardly from the bottom face portion 36b of the floor under cover 36. Accordingly, the traveling air flowing below the vehicle floor is not disturbed.

Further, even in the case where the inclination of the trailing arm 41 becomes large in the rebound position Z or the like, the gap between the front edge of the arm cover 36 and the rear end portion of the floor under cover 36 which is positioned closely to the front edge of the arm cover 60 can be as narrow as possible because of the front part 60ƒ of the arm cover 60 being configured to have the smaller inclination angle, so that the disturbance of the vehicle rear airflow caused by the level gap between the arm cover 60 and the lower face of the floor under cover 36 can be properly suppressed.

In the embodiment of the present invention, the arm cover 60 is configured such that the main part 60m and the front part 60ƒ are positioned below the line β connecting the pivot point where the font end portion of the trailing arm 41 is pivotally supported and the rear-end upper portion of the arm cover 60, the main part 60m of the arm cover 60 which faces the spring supporting part 52a of the spring seat (see the lower spring seat 52) which supports the lower portion of the suspension spring (see the coil spring 56) is configured to be linear, and the front part 60ƒ of the arm cover 60 is configured to be curved forwardly and downwardly (see FIG. 4).

According to this embodiment, by configuring the main part 60m and the front part 60ƒ of the arm cover 60 as described above, the main part 60m can be located at the lower position and also the front part 60ƒ can be made close to the floor under cover 36, so that attachment-level variations of the floor under cover 36 can be properly reduced.

Further, in another embodiment of the present invention, the arm cover 60 further comprises the rear part 60r of the arm cover 60 which is provided in back of the main part 60m is configured to be curved rearwardly and upwardly (see FIG. 4).

According to this embodiment, it can be properly prevented that the rear end portion of the arm cover 60 hits against the road surface because of the curved shape of the rear part 60r of the arm cover 60.

In correspondence of the present invention to the above-described embodiment, the suspension spring of the present invention corresponds to the coil spring 56 of the embodiment. Likewise, the spring seat corresponds to the lower spring seat 52. However, the present invention is not limited to the above-described embodiment only.

What is claimed is:

1. A vehicle-body lower face structure, comprising:
    a torsion beam type of rear suspension comprising a pair of right-and-left trailing arms and a torsion beam connecting the trailing arms;
    a floor under cover for airflow straightening attached to a portion of a vehicle body in front of the rear suspension so as to cover a vehicle-body lower face;
    an arm cover for airflow straightening attached to a lower portion of each of the trailing arms of the rear suspension so as to cover a lower face of the trailing arm,
    wherein said arm cover comprises a main part and a front part which is provided in front of the main part, and the main part and the front part of the arm cover are configured such that when said rear suspension takes a standard vehicle-weight position, both of the main part and the front part are respectively inclined rearwardly and downwardly, wherein an angle of inclination of said rearwardly-and-downwardly inclined front part is smaller than an angle of inclination of said rearwardly-and-downwardly inclined main part of the arm cover.

2. The vehicle-body lower face structure of claim 1, wherein
    said arm cover attached to the lower portion of the trailing arm is configured such that when the rear suspension takes the standard vehicle-weight position, a front edge of said front part of the arm cover is located at a higher level than a bottom face portion of said floor under cover, and when the rear suspension takes a rebound position, the front edge of the front part of the arm cover is located at a position which is higher than a level of the bottom face portion of the floor under cover and close to a rear end portion of the floor under cover.

3. The vehicle-body lower face structure of claim 1, wherein
    said arm cover is configured such that said main part and said front part are positioned below a line connecting a pivot point where a font end portion of said trailing arm is pivotally supported and a rear-end upper portion of the arm cover, said main part of the arm cover which faces a spring supporting part of a spring seat which supports a lower portion of a suspension spring is configured to be linear, and said front part of the arm cover is configured to be curved forwardly and downwardly.

4. The vehicle-body lower face structure of claim 2, wherein
    said arm cover is configured such that said main part and said front part are positioned below a line connecting a pivot point where a font end portion of said trailing arm is pivotally supported and a rear-end upper portion of the arm cover, said main part of the arm cover which faces a spring supporting part of a spring seat which supports a lower portion of a suspension spring is configured to be linear, and said front part of the arm cover is configured to be curved forwardly and downwardly.

5. The vehicle-body lower face structure of claim 1, wherein
    said arm cover further comprises a rear part of said arm cover which is provided in back of said main part is configured to be curved rearwardly and upwardly.

6. The vehicle-body lower face structure of claim 2, wherein
    said arm cover further comprises a rear part of said arm cover which is provided in back of said main part is configured to be curved rearwardly and upwardly.

7. The vehicle-body lower face structure of claim 3, wherein
    said arm cover further comprises a rear part of said arm cover which is provided in back of said main part is configured to be curved rearwardly and upwardly.

8. The vehicle-body lower face structure of claim 4, wherein
    said arm cover further comprises a rear part of said arm cover which is provided in back of said main part is configured to be curved rearwardly and upwardly.

* * * * *